United States Patent [19]

Kogane

[11] Patent Number: 4,634,268
[45] Date of Patent: Jan. 6, 1987

[54] PRINT MASK APPARATUS

[75] Inventor: Mikio Kogane, Kanagawa, Japan

[73] Assignee: Fuji Photo Film Co., Ltd., Kanagawa, Japan

[21] Appl. No.: 751,171

[22] Filed: Jul. 2, 1985

[30] Foreign Application Priority Data

Jul. 2, 1984 [JP] Japan ................................ 59-136879

[51] Int. Cl.[4] ............................................ G03B 27/58
[52] U.S. Cl. ........................................ 355/74; 355/54; 355/126
[58] Field of Search ...................... 355/71, 74, 75, 125, 355/126, 54

[56] References Cited

U.S. PATENT DOCUMENTS

3,807,861  4/1974  Nosco et al. ....................... 355/74 X
4,568,180  2/1986  Kogane ................................. 355/74

Primary Examiner—Richard A. Wintercorn
Attorney, Agent, or Firm—Sughrue, Mion, Zinn, Macpeak & Seas

[57] ABSTRACT

A print mask apparatus has a pair of slide members provided on a base plate such as to oppose each other and supported such as to be independently movable in the direction orthogonal to the direction in which they oppose each other. The apparatus further has a pair of mask members respectively provided on the slide members and supported such as to be independently movable orthogonally with respect to the direction of movement of the slide members. Accordingly, it is possible for print sizes to be easily changed without any need to replace the mask members with others.

26 Claims, 8 Drawing Figures

PRINT MASK APPARATUS

BACKGROUND OF THE INVENTION

1. Field of the Invention

The present invention relates to a print mask apparatus for use in a printer.

2. Description of the Prior Art

Economical sizes of color prints include various sizes, such as the E-size (about 82.5 mm by about 115 mm), the B-size (about 85 mm by about 85 mm) and so forth. The E-size particularly includes sizes which have slightly different lengths of photographic paper, for example, 114 mm, 117 mm and 120 mm, though having the same width (about 82.5 mm). Further, color prints having each of the above-described print sizes involve two different styles of printing, that is, one in which the picture has a white border around its edges and one having no such border. These printing operations are carried out in color printing laboratories in accordance with the particular requirements of customers and DP shops.

Accordingly, color printing laboratories need a printer which is capable of printing as desired various size types as described above. The photographic paper which is employed in the printer of the described type is generally in the shape of a roll, and the images formed on a photographic film are successively printed on this photographic paper.

In such a printing operation, it is inconveniently necessary to change print masks when changing from one print size to another in terms of length, or when switching over the printing style from the bordered style to the non-bordered style, or vice versa, let alone the case where the changeover between print sizes requires two kinds of photographic paper which have different widths.

It is possible to effectively employ Japanese Patent Application No. 164,095/1979 (see the specification of Japanese Patent Laid-Open No. 87,032/1981) "Print Mask Apparatus" which has been previously proposed by the applicant of the present invention as a print mask apparatus which makes it possible to vary print sizes in terms of the longitudinal direction alone and which is thus appropriate when effecting changeover between print sizes which are equal to each other in terms of the dimension in the lateral direction of the photographic paper employed but are different in terms of the dimension in the longitudinal direction of the paper.

However, when changing over the printing style between that which employs a white border and that which has no such border, it is necessary to employ a print mask apparatus which is capable of varying print sizes in terms of both the lateral and longitudinal directions of the photographic paper even when the above-described two kinds of pictures have the same print size. No print mask apparatus has heretofore been available which satisfies the above-described requirement and which enables print sizes to be easily changed over by an operation conducted externally in a state wherein the apparatus is set in a printer of the type described above.

SUMMARY OF THE INVENTION

In view of the above-described situation, it is a primary object of the present invention to provide a print mask apparatus which permits print sizes to be easily changed over by an external operation without any need to change print masks.

To this end, the present invention provides a print mask apparatus which comprises: a pair of slide members provided such as to oppose each other and supported such as to be independently movable in the direction orthogonal to the direction in which they oppose each other; a pair of mask members respectively provided on the slide members and supported such as to be independently movable in the direction of the imaginary line which bisects the slide members, each of the mask members having edges which are respectively parallel to the lateral and longitudinal directions of a photographic paper; slide member driving transmission means for respectively moving the pair of slide members in the opposite directions relative to each other; and mask member driving transmission means for respectively moving the pair of mask members in the opposite directions relative to each other, whereby it is possible for print sizes to be easily changed over by an operation conducted externally without any need to replace the mask members with others.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and in which:

FIGS. 1 to 8 in combination show one embodiment of the print mask apparatus according to the present invention, of which:

DESCRIPTION OF THE PREFERRED EMBODIMENT

FIGS. 1 to 8 show in combination one embodiment of the print mask apparatus according to the present invention.

Figure 3:
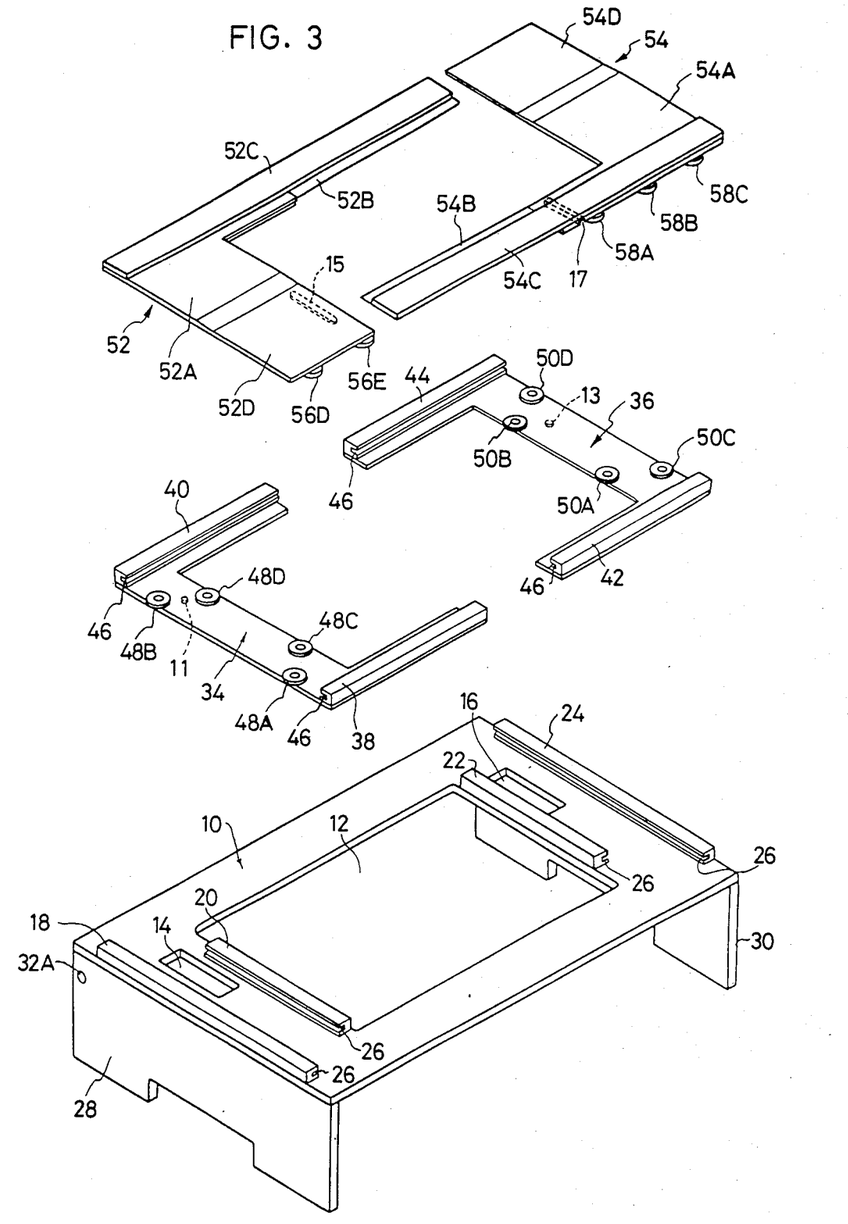
FIG. 3 is an exploded perspective view of constituent members of a part of the embodiment.

Referring first to FIG. 3, a base plate 10 has an opening 12 formed in its center and openings 14 and 16 formed on both its longitudinal end portions across the opening 12. The base plate 10 further has a pair of guide rails 18 and 20 secured to its surface across the opening 14, and a pair of guide rails 22 and 24 across the opening 16.

The guide rails 18 and 24 which are respectively located at the longitudinal ends have a length slightly shorter than the width of the base plate 10. The guide rails 20 and 22 which are located inwardly of the associated guide rails 18 and 24 have a length shorter than that of the latter. Grooves 26 which have a substantially triangular cross-section are respectively formed on the opposing surfaces of the guide rails 18 and 20 and those of the guide rails 22 and 24.

Legs 28 and 30 are secured to the reverse surface of the base plate 10 at both its longitudinal ends. The legs 28 and 30 respectively have bores 32A and 32B (not shown) formed at opposing positions and extending therethrough horizontally.

Each of the slide base plates 34 and 36 is constituted by a plate member which is obtained by cutting a flat plate into a U-like shape. A pair of guide rails 38, 40 and a pair of guide rails 42, 44 are respectively secured to the surfaces of the slide base plates 34 and 36 at both their lateral ends (the directions mentioned herein and hereinafter are set relative to the base plate 10). Grooves 46 which have a substantially triangular cross-section are respectively formed on the opposing surfaces of the guide rails 38 and 40 and those of the guide rails 42 and 44 in a manner similar to that of the above-described guide rails 18 to 24. Further, guide rollers 48A to 48D and 50A to 50D are rotatably supported on the respective surfaces of the slide base plates 34 and 36, the guide rollers having a spindle-like shape (as to the shape of these guide rollers, see guide rollers 58A to 58E shown in FIG. 5 and described later). Each of the guide rollers 48A to 50D partially projects outwardly from the end face of the corresponding one of the slide base plates 34 and 36. Further, recesses 11 and 13 which have a circular cross-section are respectively formed on the reverse surfaces of the slide base plates 34 and 36.

Figures 5, 6, 7:
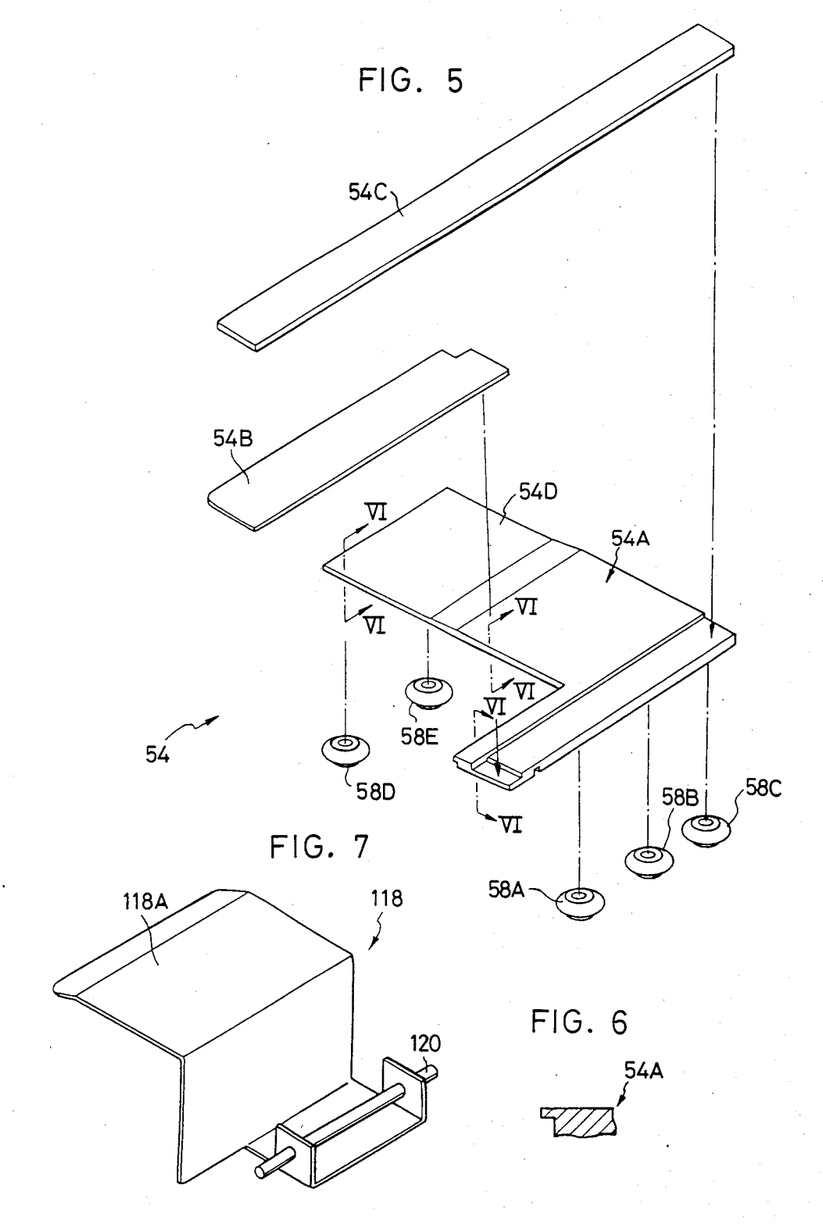
FIG. 5 is an exploded perspective view of a mask plate employed in the embodiment.
FIG. 6 is a fragmentary sectional view taken along the line VI—VI in FIG. 5.
FIG. 7 is a perspective view of a guide member employed in the embodiment.

Each of the mask plates 52 and 54 is constituted by a plurality of members which are combined together in an L-shape. More specifically, the mask plate 54 is, as shown in FIG. 5, integrally formed from an L-shaped base member 54A, a thin edge-plate member 54B and a guide plate member 54C which connects together the base member 54A and the edge plate member 54B. The surface of the portion of the base member 54A on the side thereof which is closer to one lateral end thereof is cut to provide a thin-walled portion 54D. Moreover, the inner periphery of the base member 54A is cut to provide an edge such as that shown in FIG. 6 which is equivalent to sectional views taken along the lines VI—VI in FIG. 5. Additionally, substantially spindle-shaped guide rollers 58A to 58E are rotatably supported on the reverse surface of the base member 54A. Each of the guide rollers 58A to 58E partially projects outwardly from the corresponding end face of the base member 54A.

The shape of the mask plate 52 is substantially the same as that of the mask plate 54 and is constituted by a base member 52A, an edge plate member 52B, a guide plate member 52C and guide rollers 56A to 56E.

It is to be noted that the base member 52A of the mask plate 52 has on its reverse surface a slot-like recess 15 which has a rectangular cross-section and extends laterally of the base plate 10. The base member 54A of the mask plate 54 also has on its reverse surface a recess 17 which has a rectangular cross-section and extends over the entire width thereof in the lateral direction of the base plate 10.

Figure 1:
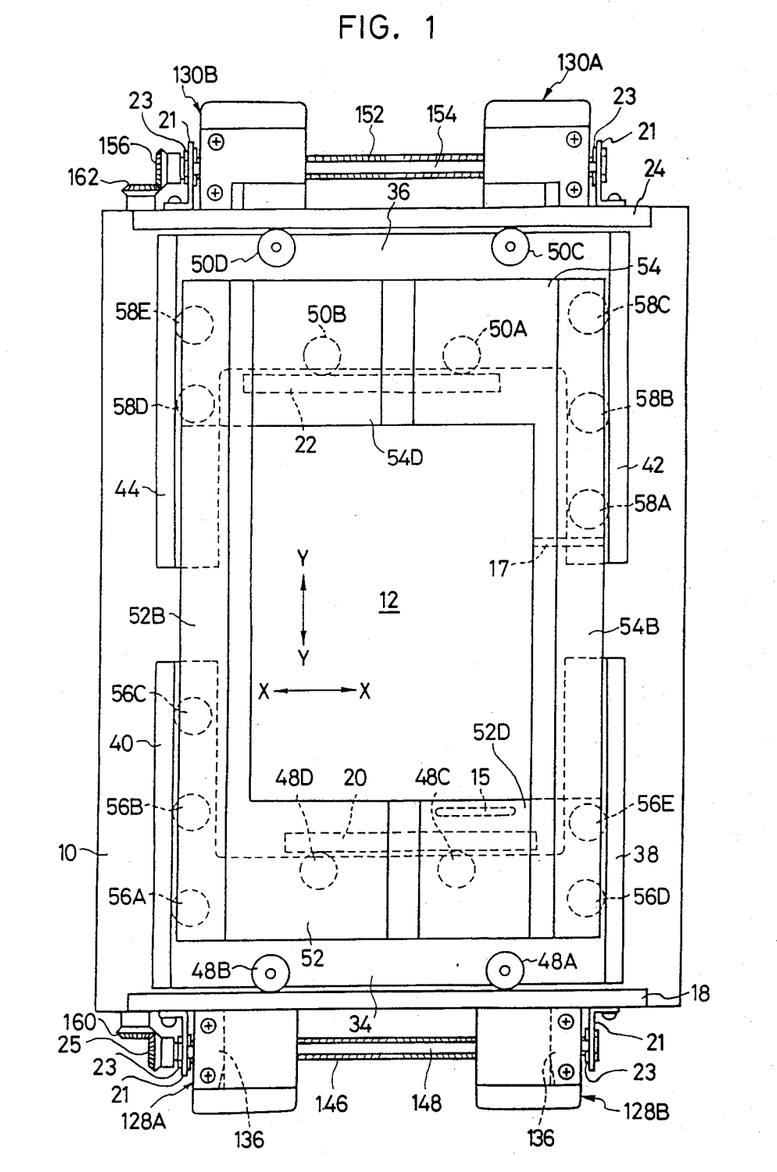
FIG. 1 is a plan view of the embodiment.

The base plate 10, the pair of slide base plates 34, 36 and the pair of mask plates 52, 54, which are arranged as above, are assembled together in such a manner that the slide base plates 34, 36 are mounted on the base plate 10 and the mask plates 52, 54 are respectively mounted on the slide base plates 34, 36, thus constituting a planar structure such as that shown in FIG. 1. The slide base plate 34 is supported such as to be movable laterally of the base plate 10 by virtue of the guide rollers 48A to 48D which are received in the respective grooves 26 of the guide rails 18 and 20 secured to the base plate 10. The slide base plate 36 is also supported such as to be movable laterally of the base plate 10 by virtue of the guide rollers 50A to 50D which are received in the respective grooves 26 of the guide rails 22 and 24 secured to the base plate 10 in a manner similar to that of the slide base plate 34.

On the other hand, the mask plate 52 is supported such as to be movable longitudinally of the base plate 10 by virtue of the guide rollers 56A to 56E which are received in the respective grooves 46 of the guide rails 38 and 40 secured to the slide base plate 34. The mask plate 54 is also supported such as to be movable longitudinally of the base plate 10 by virtue of the guide rollers 58A to 58E which are received in the respective grooves 46 of the guide rails 42 and 44 secured to the slide base plate 36 in a manner similar to that of the mask plate 52.

It is to be noted that the mask plates 52 and 54 are combined together in such a manner that the edge plate member 52B of the mask plate 52 is mounted on the upper side of the thin-walled portion 54D of the base member 54A of the mask plate 54, while the edge plate member 54B of the mask plate 54 is mounted on the upper side of the thin-walled portion 52D of the base member 52A of the mask plate 52.

The pair of slide base plates 34, 36 and the pair of mask plates 52, 54 are respectively connected to a slide base plate driving transmission means and a mask plate driving transmission means which are disposed on the reverse surface of the base plate 10 in such a manner that the above-described plates are movable.

Figure 2:
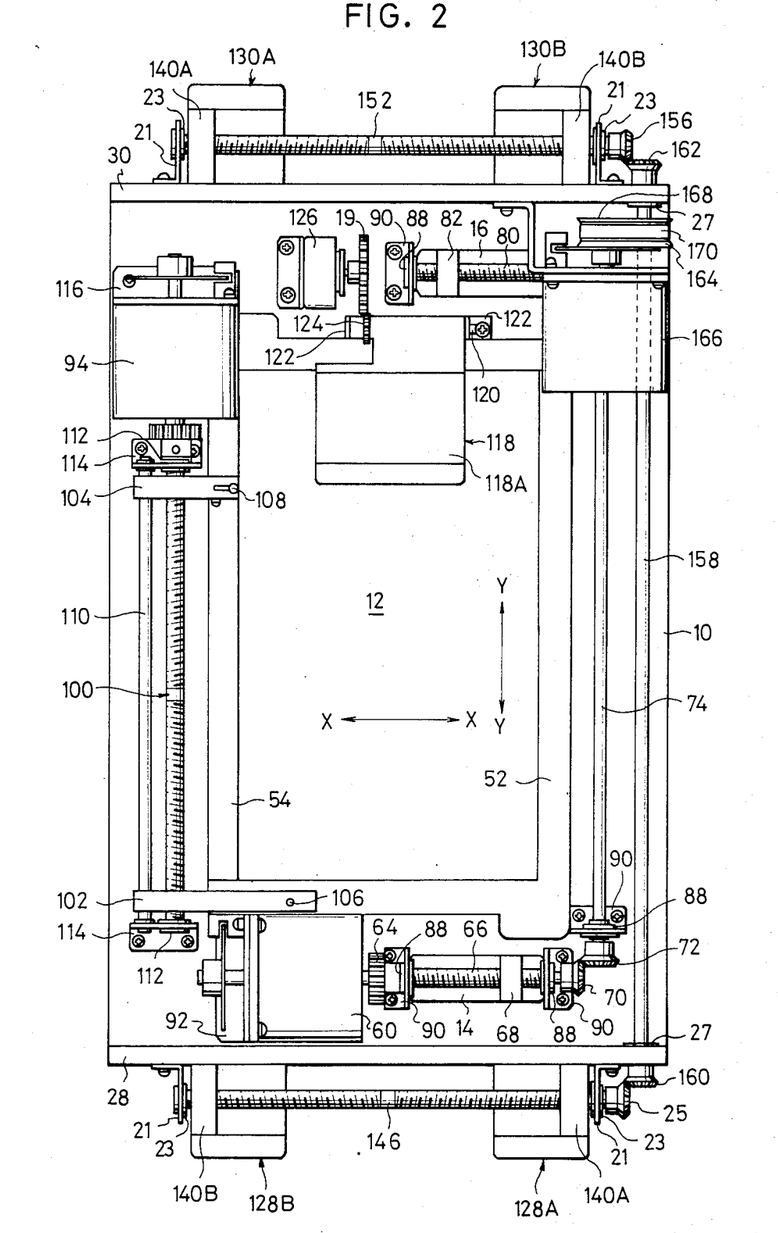
FIG. 2 is a rear view of the embodiment.
Figure 4:
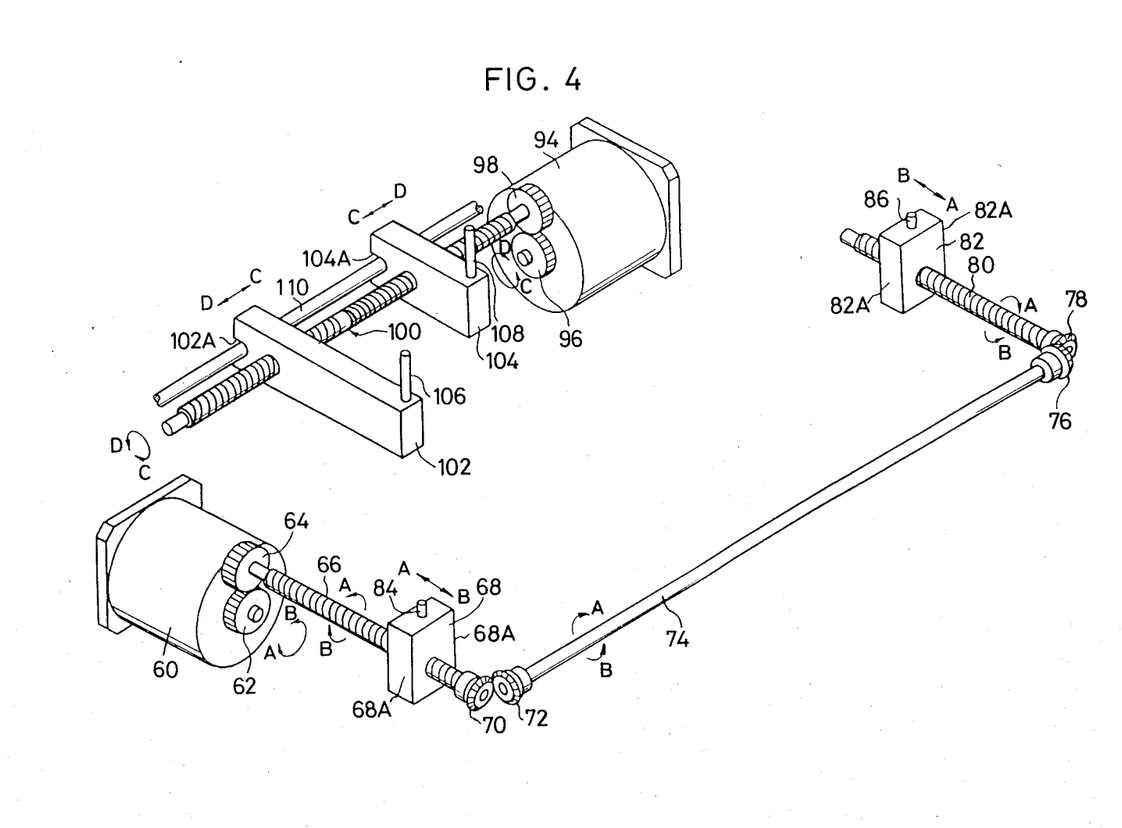
FIG. 4 is a perspective view of driving transmission means employed in the embodiment.

The above-described driving transmission means will now be explained with reference to FIGS. 2 and 4. It is to be noted that, for the sake of illustrative convenience, the driving transmission means shown in FIG. 4 are drawn in reverse orientation to those which are shown in FIG. 2 in terms of the sides with respect to the longitudinally central line of the base plate 10 (the center line which is parallel to the line Y—Y of FIG. 2).

The slide base plate driving tansmission means is composed of: a pulse motor 60; a spur gear 64 secured to the rotating shaft of the motor 60; a spur gear 64 meshed with the spur gear 62; a first screw shaft 66 having one end thereof secured to the spur gear 64; a first slide nut 68 screwed on the first screw shaft 66; a bevel gear 70 secured to the other end of the first screw shaft 66; a bevel gear 72 meshed with the bevel gear 70; a connecting shaft 74 having one end thereof secured to the bevel gear 72; a bevel gear 76 secured to the other end of the connecting shaft 74; a bevel gear 78 meashed with the bevel gear 76; a second screw shaft 80 having one end thereof secured to the bevel gear 78; and a second slide nut 82 meshed with the second screw shaft 80.

A pin 84 is secured to the first slide nut 68 in such a manner as to project from the upper surface thereof. The pin 84 is passed through the opening 14 formed in the base plate 10 and fitted in the recess 11 formed on the reverse surface of the slide base plate 34. It is to be noted that the first slide nut 68 is slidably fitted into the opening 14 formed in the base plate 10 with its lateral end faces 68A parallel to the axis of the first screw shaft 66.

A pin 86 is secured to the second slide nut 82 in such a manner as to project from the upper surface thereof. The pin 86 is passed through the opening 16 formed in the base plate 10 and fitted into the recess 13 formed on the reverse surface of the slide base plate 36. It is to be noted that the second slide nut 82 is slidably fitted into the opening 16 formed in the base plate 10 with its lateral end faces 82A parallel to the axis of the second screw shaft 80.

Each of the first and second screw shafts 66 and 80 is formed with a right-hand thread. Further, both end portions of each of the first screw shaft 66, the connecting shaft 74 and the second screw shaft 80 are rotatably supported by respective brackets 90 through associated bearings 88, the brackets 90 being secured to the reverse surface of the base plate 10. The pulse motor 60 is also supported by a bracket 92 which is in turn secured to the reverse surface of the base plate 10.

The mask plate driving transmission means is composed of: a pulse motor 94; a spur gear 96 secured to the rotating shaft of the motor 94; a spur gear 98 meshed with the spur gear 96; a third screw shaft 100 having one end thereof secured to the spur gear 98; and first and second slide supports 102 and 104 meshed with the third screw shaft 100.

A pin 106 is secured to the first slide support 102 in such a manner as to project from the upper surface thereof. The pin 106 is passed through the opening 12 formed in the center of the base plate 10 and fitted into the recess 15 formed on the reverse surface of the mask plate 52. A pin 108 is secured to the second slide support 104 in such a manner as to project from the upper surface thereof. The pin 108 is passed through the opening 12 formed in the center of the base plate 10 and fitted into the recess 17 formed on the reverse surface of the mask plate 54.

The third screw shaft 100 is divided into two oppositely threaded portions separated by an unthreaded boundary at its center. One of these portions is formed with a left-hand thread onto which the first slide support 102 is screwed. The other portion of the shaft 100 is formed with a right-hand thread onto which the second slide support 104 is screwed. The first and second slide supports 102 and 104 are respectively formed with notches 102A and 104A into which a guide shaft 110 is slidably fitted. Both end portions of the guide shaft 110 are respectively secured to brackets 114 which are secured to the reverse surface of the base plate 10. Both end portions of the third screw shaft 100 are also rotatably supported by the brackets 114 through associated bearings 112. The pulse motor 94 is supported by a bracket 116 which is in turn secured to the reverse surface of the base plate 10.

The following is a description of a photographic paper conveying and guiding mechanism.

A guide member 118 which is shown in FIG. 2 is constituted by a plate material which is bent in a substantially Z-shape such as that shown in FIG. 7, the guide member 118 having a shaft 120 secured to one end thereof. The shaft 120 is, as shown in FIG. 2, pivotally supported by a bracket 122 which is secured to the reverse surface of the base plate 10, and a spur gear 124 which is secured to one end of the shaft 120 is meshed with a spur gear 19 which is secured to a rotary solenoid 126. The rotary solenoid 126 is secured to the reverse surface of the base plate 10. The surface 118A of the guide member 118 on the side thereof which is remote from the position where the guide member 118 is pivotally supported has its distal end portion bent at an obtuse angle.

A pair of transfer guide members 128A, 128B and a pair of transfer guide members 130A and 130B, which are shown in FIGS. 1 and 2, are respectively disposed adjacently to both longitudinal ends of the base plate 10. The transfer guide member 128A is, as shown on the left-hand side of FIG. 8, composed of a plate member 132 having one end thereof bent upwardly, a plate member 134 having one end thereof bent downwardly and a plate member 136 of narrow width which is disposed between the plate members 132 and 134, these plate members 132, 134 and 136 being secured to a slide nut 140A by bolts 138. The slide nut 140A is formed with a notch 142 and threaded holes 144. On the other hand, the transfer guide member 128B is composed of plate members 132, 134 and 136 which are secured to a slide nut 140B in such a manner that they are symmetrical with those of the transfer guide member 128A with respect to the longitudinal axis of the base plate 10.

Two brackets 21 are, as shown in FIGS. 1 and 2, secured at both lateral ends of the outer surface of the leg 28 which is secured to the reverse surface of the base plate 10. A screw shaft 146 is rotatably supported by the brackets 21 through associated bearings 23. Further, a guide shaft 148 is supported by the brackets 21 above the screw shaft 146. The screw shaft 146 is divided into two oppositely threaded portions with an unthreaded boundary at the center thereof. One of these portions has a left-hand thread onto which the slide nut 140A of the transfer guide member 128A is screwed. The other portion of the screw shaft 146 has a right-hand thread onto which the slide nut 140B of the transfer guide member 128B is screwed. Moreover, the slide nuts 140A and 140B are slidably fitted on the guide shaft 148 through their respective notches 142.

Figure 8:
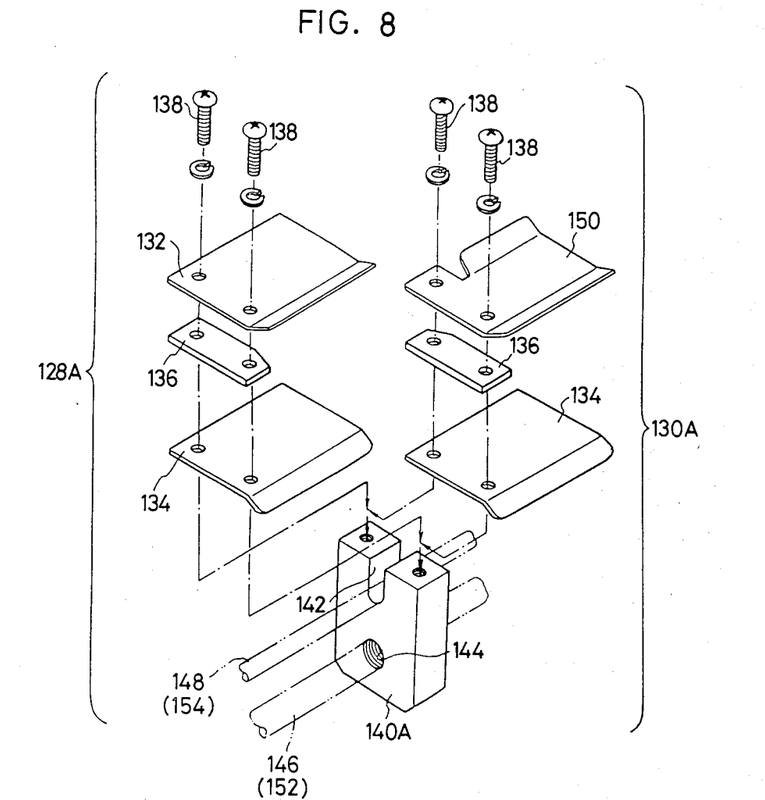
FIG. 8 is an exploded perspective view of a transfer guide member employed in the embodiment.

The transfer guide member 130A is, as shown on the right-hand side of FIG. 8, composed of a plate member 150 having both its ends bent upwardly, a plate member 134 having one end thereof bent downwardly and a plate member 136 of narrow width which is disposed between the plate members 150 and 134, these plate members being secured by bolts 138 to a slide nut 140A which has the same configuration as the above. On the other hand, the transfer guide member 130B is constituted by plate members 150, 134 and 136 which are secured to a slide nut 140B in such a manner that they are symmetrical with those of the transfer guide member 130A with respect to the longitudinal axis of the base plate 10.

The transfer guide members 130A and 130B are slidably fitted on a guide shaft 154 through thread engagement between their respective slide nuts 140A, 140B and a screw shaft 152 in a manner similar to that of the above-described transfer guide members 128A and 128B. It is to be noted that the screw shaft 152 is divided into two oppositely threaded portions which are separated by an unthreaded boundary at the center thereof and that the portion with a left-hand thread has the slide nut 140A of the transfer guide member 130A screwed onto it, while the portion with a right-hand thread has the slide nut 140B of the transfer guide member 130B screwed onto it. Further, both ends of each of the screw shaft 152 and the guide shaft 154 are respectively supported by brackets 21 which are secured to the leg 30, the screw shaft 152 being rotatably supported through associated bearings 23.

The screw shafts 146 and 152 have bevel gears 25 and 156 secured to their respective ends. These bevel gears 25 and 156 are respectively meshed with bevel gears 160 and 162 which are secured to both ends of a connecting shaft 158. The connecting shaft 158 is rotatably supported through bearings 27 by the bores 32A (see FIG. 3) and 32B (not shown) which are respectively formed in the legs 28 and 30. A pulley 164 is secured to the connecting shaft 158. The pulley 164 is connected through a timing belt 170 to a pulley 168 which is secured to the rotating shaft of a pulse motor 166. The pulse motor 166 is secured to the reverse surface of the base plate 10.

The operation of this embodiment will now be described.

A photographic paper of continuous length (not shown) is fed from the lower side to the upper side as viewed in FIG. 1. When the photographic paper is automatically loaded, the transfer guide members 128A, 128B and 130A, 130B have already been moved so that the distance between each pair of transfer guide members equals the width of the photographic paper. In addition, the guide member 118 has already been pivoted to the position shown in FIG. 2, so that the surface 118A which is of the guide member 118 on the side remote from where the guide member 118 is pivotally supported, is held above the plane of the opening 12 of the base plate 10.

When the photographic paper is automatically loaded for the purpose of printing a picture with a white border, the mask plates 52 and 54 have previously been moved to a position where a given print size can be obtained by driving the respective pulse motors 60 and 90. Accordingly, the width, in the direction X (the lateral direction of the base plate 10), of the opening 12 which is defined by the mask plates 52 and 54 is smaller than the width of the photographic paper. It is therefore possible for the photographic paper to be smoothly conveyed without any risk of the photographic paper undesirably entering the opening 12. Further, since the center of the leading end of the photographic paper is guided by the surface 118A of the guide member 118, even if the lateral center of the photographic paper is curved downwardly, the photographic paper is smoothly conveyed without colliding against the base member 54A of the mask plate 54.

On the other hand, when the photographic paper is automatically loaded for the purpose of printing a picture without a white border, the setting of the apparatus is partially different from that in the case of the above-described operation of printing a picture with a white border. More specifically, the width, in the direction X, of the opening 12 defined by the mask plates 52 and 54 is first set in a manner similar to that in the case of printing a picture with a white border, whereby the photographic paper is prevented from undesirably entering the opening 12. Then, when the leading end of the photographic paper has passed the transfer guide members 130A and 130B on the outlet side of the apparatus, the pulse motors 60 and 90 are actuated such as to move the mask plates 52 and 54 to respective positions where the width, in the direction X, of the opening 12 is larger than the width of the photographic paper.

In the case where the same photographic paper is to be subjected to printing operations for pictures with and without a white border, the pulse motors 60 and 90 are successively or simultaneously actuated such as to move the mask plates 52 and 54 by predetermined distances in both the X-direction and the Y-direction (the longitudinal direction of the base plate 10), whereby it is possible to easily change over the above-described printing operation from one mode to another. When it is necessary to effect a change-over of print sizes which requires the photographic paper to be replaced by another of a required width, the first photographic paper is removed, the setting is effected as described above, and then a required photographic paper is fed, whereby the required change-over of print sizes can be easily effected.

The movement of each of the above-described mask plates 52, 54, transfer guide members 128A to 130B and guide member 118 is effected in the following manner.

The movement of the mask plates 52 and 54 in the X-direction is conducted by the drive of the pulse motor 60 through the slide base plates 34 and 36. More specifically, as the pulse motor 60 is driven in the direction of the arrow A in FIG. 4, the first screw shaft 66 is rotated in the direction of the arrow A through the spur gears 62 and 64, and the second screw shaft 80 is rotated in the direction of the arrow A through the bevel gears 70, 72, the connecting shaft 74 and the bevel gears 76, 78. Since the first and second screw shafts 66 and 80 are both formed with right-hand threads and the directions of rotation of both are different from each other, the first and second slide nuts 68 and 82 which are respectively screwed thereon move straight in opposite directions to each other while being repectively guided by the openings 14 and 16 formed in the base plate 10. In this case, the first and second slide nuts 68 and 82 move so as to approach each other. On the other hand, when the pulse motor 60 is rotated in the direction of the arrow B, the first and second slide nuts 68 and 82 move away from each other.

With the respective movements of the first and second slide nuts 68 and 82, the slide base plates 34 and 36 move towards or away from each other in the directions shown by the arrows X—X through the respective pins 84 and 86. It is possible for the slide base plates 34 and 36 to move smoothly by virtue of the guide rollers 48A to 48D and 50A to 50D which are respectively rotatably supported thereon and which are guided by the respective grooves 26 of the guide rails 18, 20 and 22, 24. With the respective movements of the slide base plates 34 and 36 in the X-directions, the mask plates 52 and 54 whose movement in the X-direction relative to their respective slide base plates 34 and 36 is limited respectively move in the opposite X-directions relative to the base plate 10. More specifically, the mask plates 52 and 54 are allowed to move in such a manner as to respectively coincide with the first and second slide nuts 68 and 82 in terms of both moving direction and moving distance.

It is to be noted that, although the mask plates 52 and 54 are respectively engaged with the first and second slide supports 102 and 104 through the associated pins 106 and 108, there is no risk of the mask plates 52 and 54 being hindered from moving in the X-directions since the pins 106 and 108 respectively slide along the recesses 15 and 17 which are formed on the mask plates 52 and 54 in such a manner as to extend to a substantial degree in the X-direction.

On the other hand, the respective movements of the mask plates 52 and 54 in the Y-directions are effected by driving the pulse motor 94. More specifically, as the pulse motor 94 is rotated in the direction of the arrow C in FIG. 4, the third screw shaft 100 is rotated in the direction of the arrow C through the spur gears 96 and 98. Since one end of the third screw shaft 100 has a left-hand thread with the first slide support 102 screwed thereon and the other end of the shaft 100 has a right-hand thread with the second slide support 104 screwed thereon, the first and second slide supports 102 and 104 move straight in the opposite direction to each other while being guided by the guide shaft 110. In this case, the first and second slide supports 102 and 104 move toward each other. On the other hand, when the pulse motor 94 is rotated in the direction of the arrow D, the first and second slide supports 102 and 104 move away from each other.

With the respective movements of the first and second slide supports 102 and 104, the mask plates 52 and 54 move toward or away from each other in the Y-direction through the respective pins 106 and 108. The respective movements of the mask plates 52 and 54 are smoothly performed by virtue of the guide rollers 56A to 56E and 58A to 58E which are rotatably supported thereon and which are guided by the respective grooves 46 of the guide rails 38, 40 and 42, 44.

As described above, the respective movements of the mask plates 52 and 54 in the X-directions are effected through the respective slide base plates 34 and 36, while their movements in the Y-directions are directly performed, and the movement of the mask plates 52 and 54 in either of the two directions is not restrained by their movement in the other direction. It is therefore possible for the mask plates 52 and 54 to be moved independently. Accordingly, it is also possible for the mask plates 52 and 54 to be moved in both X- and Y-directions at the same time by simultaneously driving the pulse motors 60 and 94.

The pair of transfer guide members 128A, 128B and the pair of transfer guide members 130A, 130B are respectively disposed on the photographic paper inlet and outlet sides so as to transfer and guide a roll of photographic paper. The photographic paper is clamped at both its lateral edges by the transfer guide members 128A and 128B on the inlet side and clamped by the transfer guide members 130A and 130B on the outlet side. It is therefore necessary to move the position of each of the transfer guide members in accordance with the width of the photographic paper employed. On the inlet side, the photographic paper has the upper and lower surfaces of each of its lateral edges respectively guided by the plate members 132 and 134 and both its lateral end faces respectively guided by the plate members 136. On the outlet side, the photographic paper has the upper and lower surfaces of each of its lateral edges respectively guided by the plate members 150 and 134 and its lateral end faces respectively guided by the plate members 136.

The transfer guide members 128A to 130B are moved in synchronism with each other in the following manner, so that the respective inner end faces of the plate members 136 are made coincident with the inner end faces of the guide plates 52B and 54B of the mask plates 52 and 54, respectively.

More specifically, as the pulse motor 166 is actuated, the connecting shaft 158 is rotated through the pulley 168, the timing belt 170 and the pulley 164. In response to the rotation of the connecting shaft 158, the screw shafts 146 and 152 are rotated in opposite directions relative to each other through the bevel gears 160, 25 and 162, 156. With the rotation of the screw shafts 146 and 152, all the transfer guide members 128A to 130B are moved by the same distance and in the same direction while being guided by the guide shafts 148 and 154. It is to be noted that the expression "all the transfer guide members are moved in the same direction" mentioned herein means that all the transfer guide members are moved in a direction in which they come toward or away from each other relative to the longitudinally central line of the base plate 10 (the center line parallel to the line Y—Y in FIG. 2).

The guide member 118 has already been pivoted to the position shown in FIG. 2 when the leading end of a new photographic paper is fed, as described above. However, when a printing operation is to be effected, the rotary solenoid 126 is excited such as to turn the shaft 120 through the spur gears 19 and 124 and hence retract the guide member 118 from the opening 12 of the base plate 10, thereby avoiding any interference of the guide member 118 with printing light rays.

It is possible to effect the above-described movements of the various members, that is, the movements of the mask plates 52 and 54 in the X- and Y-directions, the movements of the transfer guide members 128A to 130B and the pivoting of the guide member 118, by controlling the pulse motors 60, 94 and 166 and the rotary solenoid 126 through an operation conducted externally. Accordingly, it is possible for print sizes to be easily changed over by an external operation in a state wherein the print mask apparatus is already set in the printer.

It is to be noted that, although illustration and description are omitted, a sensor is disposed at each of the moving portions for the purpose of detecting the positions thereof at any given time. It is therefore possible for the movement control to be reliably effected.

Further, the edge plate members 52B and 54B of the mask plates 52 and 54 may be provided with means for printing a brand name on the photographic paper or means for printing a cut mark and a sorting mark as are employed in printing a picture with a white border. Furthermore, each of the mask plates 52 and 54 may be provided with a pressure plate which is adapted to press the photographic paper from the upper side thereof to thereby bring it into close contact with the mask plate, or means (a puncher) for punching out a cut mark or a sorting mark which is employed in printing a picture without a white border, these means being disposed at a position where they do not interfere with the movement of the mask plate.

As has been described above, in the print mask apparatus according to the invention, the slide members which movably support the respective mask members are movably supported, and the mask members and the slide members are individually moved by the respective driving transmission means. It is therefore advantageously possible for change-over of print sizes to be effected by an external operation without any need to replace the mask members with others.

What is claimed is:

1. A print mask apparatus for defining a print mask opening having plural sides, for use in a printer which effects printing on a photographic paper, said print mask apparatus comprising:
 (a) a pair of slide members provided such as to oppose each other and supported such as to be independently movable in the direction orthogonal to the direction in which they oppose each other;
 (b) a pair of mask members respectively provided on said slide members and supported such as to be independently movable in a direction substantially parallel to an imaginary line which bisects said slide members, each of said mask members having first and second edges which are respectively parallel to the lateral and longitudinal directions of said photographic paper for defining adjacent sides of said opening;

(c) slide member driving transmission means for respectively moving said pair of slide members in the opposite directions relative to each other;

(d) mask member driving transmission means for respectively moving said pair of mask members in the opposite directions relative to each other, whereby it is possible for the change-over of print sizes to be easily effected by an operation conducted externally without any need to replace said mask members with others.

2. A print mask apparatus according to claim 1, wherein each of said slide members has guide means provided on each of said slide members and adapted to guide the corresponding mask member in the direction of an imaginary line which bisects said slide members.

3. A print mask apparatus according to claim 1, wherein said first and second edges of each of said mask members are fixed with respect to each other.

4. A print mask apparatus according to claim 1, wherein said slide members are supported on a base plate which has an opening formed in its center.

5. A print mask apparatus according to claim 4, wherein said mask member driving transmission means includes: a motor; a screw shaft rotated by said motor, said screw shaft having oppositely threaded portions respectively formed at both ends which are separated by an unthreaded boundary at the axial center of said shaft; a first slide support screwed on one of said threaded portions and having a pin received in a recess which is formed in one of said mask members; and a second slide support screwed on the other threaded portion and having a pin received in a recess which is formed in the other mask member.

6. A print mask apparatus according to claim 4, further comprising a pair of parallel guide means provided on said base plate across said opening and adapted to respectively guide said slide members.

7. A print mask apparatus according to claim 6, further comprising guide means provided on each of said slide members and adapted to guide the corresponding mask member in the direction orthogonal to the moving direction of said slide member.

8. A print mask apparatus according to claim 7, wherein each of said guide means on said base plate includes two parallel guide rails having guide grooves respectively formed on their opposing surfaces.

9. A print mask apparatus according to claim 8, wherein each of said slide members has a U-shaped base portion disposed between said two guide rails and a pair of parallel leg portions extending from both ends of said base portion toward the other slide member.

10. A print mask apparatus according to claim 9, wherein the base portion of each of said slide members is provided thereon with guide rollers which are received in said guide grooves of said guide rails.

11. A print mask apparatus according to claim 10, wherein said guide means on each of said slide members includes parallel guide rails respectively provided on said leg portions, said guide rails having guide grooves respectively formed on their opposing surfaces.

12. A print mask apparatus according to claim 11, wherein each of said mask members has a substantially L-shape and is disposed between said guide rails on the corresponding slide member in such a manner that the respective inner peripheries of said L-shaped mask members oppose each other, and guide rollers provided on each of said mask members are received in said guide grooves of said guide rails.

13. A print mask apparatus according to claim 4, wherein said slide member driving transmission means includes: a motor; a first screw shaft rotated by said motor; a first slide nut screwed on said first screw shaft and having a projection inserted into a bore which is formed in one of said slide members; a second screw shaft to which the rotational force of said first screw shaft is transmitted; and a second slide nut screwed on said second screw shaft and having a projection inserted into a bore which is formed in the other slide member.

14. A print mask apparatus employed in a printer which effects printing on a photographic paper, which comprises:

(a) a base plate having an opening formed in its center;

(b) a pair of slide members supported by said base plate and provided so as to oppose each other, wherein each of said slide members has a substantially U-shaped base portion having guide rollers thereon and a pair of parallel leg portions extending from both ends of said base portion toward the other slide member, and each of said slide members is supported so as to be indpendently movable in the direction orthogonal to the direction in which they oppose each other;

(c) a pair of parallel first guide means provided on said base plate across said opening and adapted to respectively guide said slide members, each of said first guide means including two parallel guide rails having guide grooves respectively formed on their opposing surfaces, said two guide rails having said U-shaped base portion of said slide member disposed therebetween with said guide rollers of said base portion being received in said guide grooves of said guide rails;

(d) a pair of substantially L-shaped mask members respectively provided on said slide members and supported so as to be independently movable in the direction of an imaginary line which bisects said slide members, each of said mask members having edges which are respectively parallel to the lateral and longitudinal directions of said photographic paper;

(e) second guide means provided on each of said slide members and adapted to guide the corresponding mask member in the direction orthogonal to the moving direction of said slide member, said guide means on each of said slide members including parallel guide rails respectively provided on said leg portions, said guide rails having guide grooves respectively formed on their opposing surfaces, said guide grooves having a corresponding one of said mask members disposed therebetween in such a manner that the respective inner peripheries of said L-shaped mask members oppose each other, and guide rollers provided on each of said mask members are received in said guide grooves of said guide rails;

(f) slide member driving transmission means for respectively moving said pair of slide merbers in the opposite directions relative to each other, said slide member driving transmission means including: a motor; a first screw shaft rotated by said motor; a first slide knot screwed on said first screw shaft and having a projection inserted into a bore which is formed in one of said slide members; a second screw shaft to which the rotational force of said first screw shaft is transmitted; and a second slide knot screwed on said second screw shaft and having a projection inserted into a bore which is formed in the other slide member; and (g) mask member driving transmission means for respectively moving said pair of mask members in the opposite directions relative to each other.

15. A print mask apparatus according to claim 14, wherein said mask member driving transmission means includes: a motor; a third screw shaft rotated by said motor, said third screw shaft having oppositely threaded portions respectively formed at both ends which are separated by an unthreaded boundary at the axial center of said shaft; a first slide support screwed on one of said threaded portions and having a pin received in a recess which is formed in one of said mask members; and a second slide support screwed on the other threaded portion and having a pin received in a recess which is formed in the other mask member.

16. A print mask apparatus according to claim 15, further comprising a guide mechanism adapted for guiding said photographic paper.

17. A print mask apparatus according to claim 16, wherein said guide mechanism includes: a pair of transfer guide members movable in the opposite directions relative to each other and orthogonal to the moving direction of said photographic paper, said transfer guide members limiting the movement of said photographic paper in its lateral direction; and a guide member adapted for preventing the central portion of the leading end of said photographic paper in terms of its moving direction from curving downwardly.

18. A print mask apparatus for defining a print mask opening having plural sides, for use in a printer which successively effects printing on a photographic paper in the form of a roll, said print mask apparatus comprising:
(a) a base plate having a rectangular opening in its center;
(b) a pair of slide members provided such as to oppose each other across said rectangular opening and supported on said base plate such as to be independently movable in the direction orthogonal to the direction in which they oppose each other;
(c) a pair of mask members respectively provided on said slide members and supported such as to be independently movable in a direction substantially parallel to an imaginary line which bisects said slide members, each of said mask members having first and second edges which are respectively parallel to the lateral and longitudinal directions of said photographic paper for defining adjacent sides of said opening, respectively;
(d) slide member driving transmission for respectively moving said pair of slide members in the opposite directions relative to each other;
(e) mask member driving transmission means for respectively moving said pair of mask members in the opposite directions relative to each other,
whereby it is possible for the change-over of print sizes to be easily effected by an operation conducted externally without any need to replace said mask members with others.

19. A print mask apparatus according to claim 18, further comprising a pair of parallel guide means provided on said base plate across said opening and adapted to respectively guide said slide members.

20. A print mask apparatus according to claim 19, further comprising guide means provided on each of said slide members and adapted to guide the corresponding mask member in the direction orthogonal to the moving direction of said slide member.

21. A print mask apparatus according to claim 20, wherein each of said guide means on said base plate includes two parallel guide rails respectively having on their opposing surfaces guide grooves with a substantially triangular cross-section, each of said slide members including a U-shaped base portion disposed between said two guide rails and a pair of parallel leg portions extending from both ends of said base portion toward the other slide member, and said base portion having guide rollers received in said guide grooves of said guide rails.

22. A print mask apparatus employed in a printer which successively effects printing on a photographic paper in the form of a roll, which comprises:
(a) a base plate having an opening formed in its center;
(b) a pair of slide members provided so as to oppose each other across said rectangular opening and supported on said base plate so as to be independently movable in the direction orthogonal to the direction in which they oppose each other, wherein each of said slide members has a U-shaped base portion having guide rollers thereon and a pair of parallel leg portions extending from both ends of said base portion toward the other slide member;
(c) a pair of parallel first guide means provided on said base plate across said opening and adapted to respectively guide said slide members, each of said first guide means including two parallel guide rails having guide grooves with a substantially triangular cross-section respectively formed on their two opposing surfaces, said two guide rails having said U-shaped base portion of said slide member disposed between said guide rails with said guide rollers of said base portion being received in said guide grooves of said guide rails;
(d) a pair of substantially L-shaped mask members respectively provided on said slide members and supported so as to be independently movable in the direction of an imaginary line which bisects said slide members, each of said mask members having edges which are respectively parallel to the lateral and longitudinal directions of said photographic paper;
(e) second guide means provided on each of said slide members and adapted to guide the corresponding mask member in the direction orthogonal to the moving direction of said slide member, said guide means on each of said slide members including a pair of parallel guide rails respectively provided on said leg portions, said guide rails having guide grooves with a substantially triangular cross-section respectively formed on their opposing surfaces, said guide rails having a corresponding one of said mask members disposed therebetween in such a manner that the respective inner peripheries of said L-shaped mask members oppose each other, and guide rollers provided on each of said mask members are received in said guide grooves of said guide rails;

(f) slide members driving transmission means for respectively moving said pair of slide members in the opposite directions relative to each other; and (g) mask member driving transmission means for respectively moving said pair of mask members in the opposite directions relative to each other.

23. A print mask apparatus according to claim 22, wherein said slide member driving transmission means includes: a motor; a first screw shaft rotated by said motor; a first slide nut screwed on said first screw shaft and having a projection inserted into a bore which is formed in one of said slide members; a second screw shaft to which the rotational force of said first screw shaft is transmitted; and a second slide nut screwed on said second screw shaft and having a projection inserted into a bore which is formed in the other slide member.

24. A print mask apparatus according to claim 23, wherein said mask member driving transmission means includes: a motor; a third screw shaft rotated by said motor, said third screw shaft having oppositely threaded portions respectively formed at both ends which are separated by an unthreaded boundary at the axial center of said shaft; a first slide support screwed on one of said threaded portions and having a pin received in a recess which is formed in one of said mask members; and a second slide support screwed on the other threaded portion and having a pin received in a recess which is formed in the other mask member.

25. A print mask apparatus according to claim 24, further comprising a guide mechanism for guiding said photographic paper, said guide mechanism including a pair of transfer guide members, movable in the opposite directions relative to each other and orthogonal to the moving direction of said photographic paper, said transfer guide members limiting the movement of said photographic paper in its lateral direction, and a guide member adapted for preventing the central portion of the leading end of said photographic paper in terms of its moving direction from curving downwardly.

26. A print mask apparatus for defining a print mask opening having plural sides, for use in a printer which effects printing on a photographic paper, said print mask apparatus comprising:

(a) first and second slide members movable in a first direction with respect to one another;

(b) first and second mask members each slidably supported on a respective one of said first and second slide members for movement relative to said slide members in a second direction transverse to said first direction, each of said first and second mask members having first and second edges for defining adjacent sides of said print mask opening;

(c) slide member driving transmission means for moving said slide members in said first direction; and (d) mask member driving transmission means for moving said mask members in said second direction.

* * * * *